United States Patent [19]

Tanaka

[11] Patent Number: 4,797,012

[45] Date of Patent: Jan. 10, 1989

[54] LINEAR MOTION ROLLING GUIDE UNIT
[75] Inventor: Kazuhiko Tanaka, Fuchu, Japan
[73] Assignee: Nippon Thompson Co., Ltd., Tokyo, Japan
[21] Appl. No.: 165,501
[22] Filed: Mar. 8, 1988
[30] Foreign Application Priority Data Nov. 12, 1987 [JP]   Japan ................................ 62-284200

[51] Int. Cl.⁴ .............................................. F16C 29/06
[52] U.S. Cl. ..................................................... 384/45
[58] Field of Search ............................ 384/45, 44, 43; 464/168

[56]           References Cited
U.S. PATENT DOCUMENTS

| 4,527,841 | 7/1985 | Teramachi | 384/45 |
| 4,527,842 | 7/1985 | Teramachi | 384/45 |
| 4,531,788 | 7/1985 | Teramachi | 384/45 |
| 4,553,793 | 11/1985 | Teramachi | 384/45 |

Primary Examiner—Lenard A. Footland
Attorney, Agent, or Firm—Rogers & Killeen

[57]             ABSTRACT

The present narrow gauge linear motion rolling guide unit consists of a track rail member, a slidable casing straddling said track rail member in a freely slidable relation therewith with a plurality of balls being intervened therebetween, which are travelled through and along a pair of endless circulating passages provided in the slidable casing at symmetrically opposite positions relative to the longitudinal axis thereof, each endless circulating passage including a load bearing guide groove, a return passage and a pair of direction changing passages that are provided in each of the side panel fixed onto the opposing ends of said slidable casing.

Each of the direction changing passage is arranged in the side panel to form, as seen in the cross section of the unit including side panel, an arcuate section of a circle having a center that is positioned, in the side panel, and on an extention line passing through the center of a ball present in the load bearing passage and extending in parallel with the inclined inner side surface of the slidable casing, so that the distance between a pair of ball return passages built in the slidable casing can be minimized, resulting in narrowing of the breadth of the casing.

3 Claims, 5 Drawing Sheets

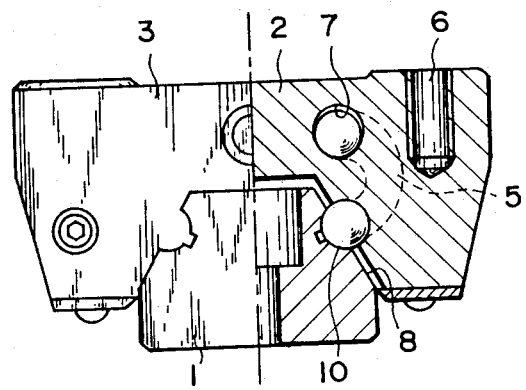
FIG_2
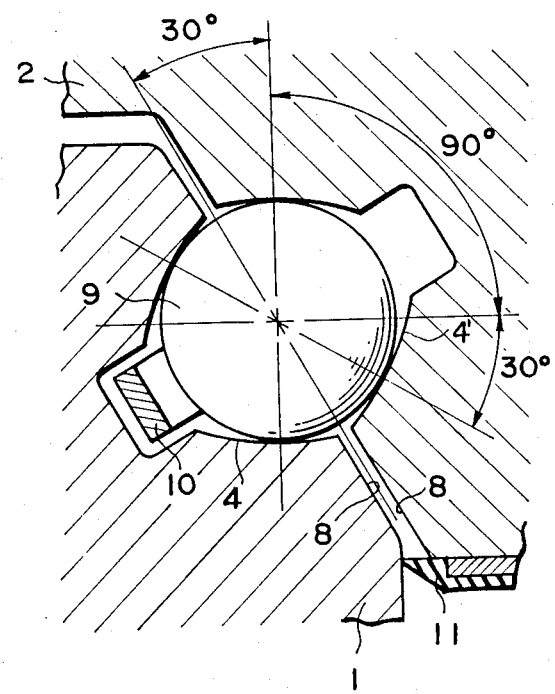
FIG_3

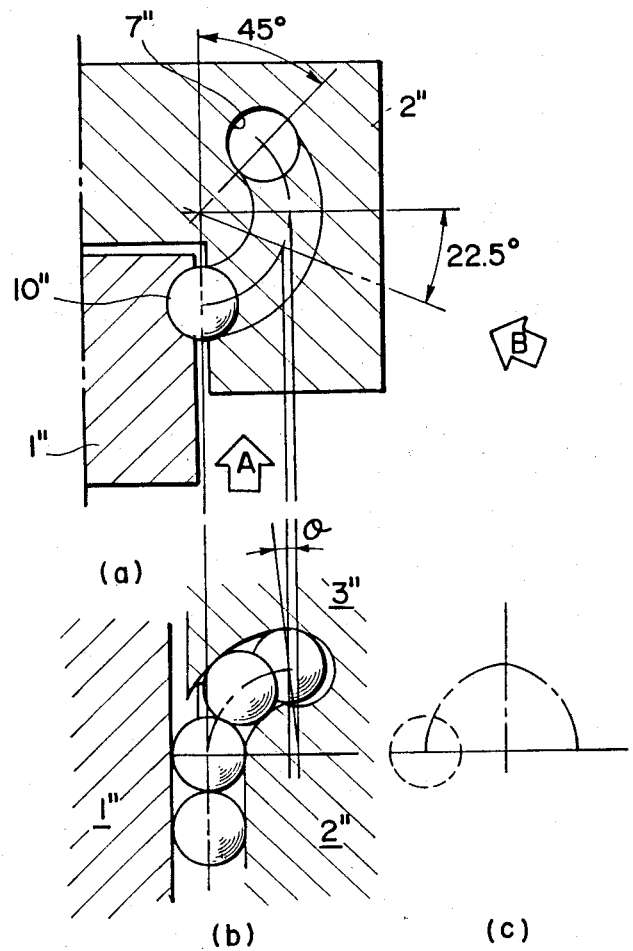

LINEAR MOTION ROLLING GUIDE UNIT

BACKGROUND OF THE INVENTION

1. Field of Invention

The present invention generally relates to a compact-size or narrow gauge linear motion rolling guide unit including a trackrail member and a casing straddling said track rail member via plurality of rolling balls which are made to move infinitely between the two members so that the linear motion guide unit provides linear motion having stabilized precision and is featured by high rigidity in structure under such a composite load as including upwardly, downwardly and laterally directioned loads, momentary load etc, therefore the present linear motion rolling guide unit can be preferably used in various industrial field such as machine tools operated under vibration and impact, robotic machines requiring high precision workings, various manufacturing machinery and so on.

2. Description of the Prior Art

A linear motion rolling guide unit is known in the art. Japanese Patent Application No. 59-109573 (FIG. 5) that was filed by the present applicant discloses a linear motion rolling guide unit comprising a track rail member 1' having a generally square cross section, a slidable casing 2' having an inverted U-shaped cross section and straddling said track rail member via a plurality of balls in freely movable relation therewith, side panels fixed onto the longitudinally opposing ends, respectively, of said slidable casing, said track rail member having a pair of guide grooves for balls on the opposite side surfaces, each extending in parallel with the longitudinal axis of said track rail member, said slidable casing 2' having a pair of guide grooves for balls in mating relation with a pair of said track rail side guide grooves so that one of the track rail side guide grooves and the mating casing side guide groove form a load bearing passage for balls between said track rail member 1' and said casing 2', said slidable casing comprising a pair of ball return passages 7' there-within, each extending in parallel with said load bearing casing side guide groove, each of said side panels comprising a pair of curved direction changing passages 5' each adapted to connect one end of the casing side guide groove with the adjacent end of the ball return passage so that together with the direction changing passage of the opposite end side panel, an endless ball circulating path is formed, wherein in each of said side panels, each of said direction changing passages is so positioned as seen on a cross section of the slidable casing that the related ball return passage may be positioned in the casing upwardly and inwardly relative to the ball located at its casing side guide groove.

With this novel arrangement of ball return passages in the casing, an appreciable technical merit was obtained such that the breadth of the casing can be markedly reduced so that the unit provided with such a compact-size casing can be used even in such a narrow space that any of linear motion rolling guide units of conventional type could not be used due to a greater casing size.

However, even the above-mentioned novel guide unit has the following disadvantages:

Namely, the length of the curved direction changing passage in the side panel becomes undesirably greater so that a greater resistance takes place when balls travel through the direction changing passage.

Furthermore, the curved configuration to be formed for direction changing passage in the side panel is complicated and further, due to the lengthened direction changing passage, the number of balls simultaneously traveling through the direction changing passage increases, thus resulting in an increased manufacturing costs.

Referring to FIG. 5, illustrating a cross section of the casing of the prior art unit, wherein the ball return passage is located inwardly toward the longitudinal axis of the casing by a distance l relative to the perpendicular line passing through the center of the ball present in the load bearing passage. In practice, a plurality of tool mounting holes 6 must be provided in the casing at the locations sufficiently apart from the inner surface thereof, therefore, even if the above-mentioned distance l is made greater, the width of the casing cannot be greatly reduced so far as tool mounting holes 6 must be provided as mentioned above.

In the light of the situation was proposed in the construction of casing that to reduce the length of the direction changing passage (refer to FIG. 6 illustrating another prior art unit), ball return passage 7'', as seen in a cross section of casing 2'', is located above and outwardly relative to the ball 10'' located in the load bearing passage. If, in this case, the ball return passage 7'' is located at an angle of 45° outwardly relative to the perpendicular line passing through the center of the load bearing ball 10'', thereby shortening the length of the direction changing passage, some of the disadvantages inherent in the above-mentioned prior art unit may be eliminated but the arcuate section of the direction changing passage along and through which the balls located in the load bearing passage are travelled in a curved path (the arcuate section defined, in FIG. 6(a), between the two dotted lines indicated by arrows A and B, respectively, which substantially corresponds to half length of the direction changing passage) has too short a distance to allow the balls making smooth direction changing movement, so that as shown in FIG. 6(b) where part of FIG. 6(a) is seen from the direction of arrow A, the length of the direction changing passage is too short as shown in FIG. 6(b) so that the said arcuate section, viz., half length of the direction changing passage must communicate with the adjoining arcuate section, viz., another half of said passage at the point to provide a length of the direction changing passage shorter by a distance corresponding to the arcuate section defined by angle θ than the circumferential distance of a complete semicircle.

Namely, the direction changing passage cannot form a complete semicircle, since each of the halves of the direction changing passage does not form a precisely quarter of a circle, so that the load bearing guide groove side half and the ball return passage side half of the direction changing passage cannot communicate tangentially with each other, thereby to give rise to rolling resistance between the balls and the inner surface of the direction changing passage when the balls are travelling therethrough.

SUMMARY OF THE INVENTION

It is therefore a main object of the present invention to obviate the above-mentioned various disadvantages of the prior art linear motion rolling guide units and to provide an improved linear motion rolling guide unit.

Another object of the present invention is to provide a linear motion rolling guide unit wherein for a predetermined thickness of the side plate, direction changing passage can be formed therein with the smoothest possible curve, yet capable of locating ball return passages in the casing at such positions as to minimize the dimention of the casing, in particular, in the widthwise direction.

A further object of the present invention is to provide a linear motion rolling guide unit requiring a less number of balls as required in any of prior art units, yet insuring high precision operation as well as less rolling resistance.

A further object of the present invention is to provide a linear motion rolling guide unit having an endless ball circulation loop wherein the non-load section consisting of direction changing passages and ball return passage has the shortest possible length, thereby reducing the number of balls circulating therethrough.

A further object of the present invention is to provide a linear motion rolling guide unit having a compact-size body, in particular, the smallest width of the casing.

A further object of the present invention is to provide a linear motion rolling guide unit including direction changing passages each providing a moderately curved path to ensure a smooth and stable movement of balls, while markedly reducing sliding resistance for balls.

A further object of the present invention is to provide a linear motion rolling guide unit wherein the materials and parts necessary for the manufacture of the casing, balls and so on may be saved and, at the same time, the workings required for the formation of the direction changing passages, guide grooves and so on are easy and simple, thus lowering the manufacturing costs.

A further object of the present invention is to provide a linear motion rolling guide unit having a greater resistance against downwardly directed load by designing the casing side and track rail side guide grooves in such a manner that the balls rolling between both the guide grooves may always contact therewith at the points that as shown in FIG. 3 a perpendicular line passing through the center of each of the balls intersects the surfaces of both the guide grooves.

The linear motion rolling guide unit of the present invention is therefore featured by comprising a track rail member having a generally square cross section, a slidable casing having an inverted U-shaped cross section and straddling said track rail member via a plurality of balls in freely movable relation therewith, side panels fixed onto the longitudinally opposing ends, respectively, of said slidable casing, said track rail member having on the side surface a pair of guide grooves for balls, each extending in parallel with the longitudinal axis of said track rail member, said slidable casing having on the inner surface a pair of guide grooves for balls in mating relation with a pair of said track rail side guide grooves so that one of the track rail side guide grooves and the mating casing side guide groove form a load bearing passage for balls between the track rail member and the slidable casing, said slidable casing comprising a pair of ball return passages therewithin, each extending in parallel with said load bearing casing side guide grooves, each of said side panels comprising a pair of direction changing passages each adapted to connect one end of the casing side guide groove with the adjacent end of the ball return passage so that together with the direction changing passage of the opposite end side panel, an endless ball circulating path is formed, wherein in each of said side panels, each of said direction changing passage is so arranged, as seen on a cross section of the unit including a side panel and vertical to the travelling direction of the slidable casing, as to form an arcuate section of a circle having a center that is positioned, in the side panel, on a line passing through the center of a ball present in said load bearing passage and extending in a parallel with the related inclined inner side surface of the slidable casing, while each of said ball return passages is formed, within the slidable casing, on the level corresponding to the uppermost part of said direction changing passage as seen in the same cross section mentioned above and further, wherein the guide groove-providing side surface of said track rail member as well as guide groove-providing inner side surface of said slidable casing is angularly formed, and further wherein each of the balls travelling through said load bearing passage is brought into contact with the track rail side groove and the casing side groove, respectively and simultaneously, at least at the opposing points that are defined by the intersecting points of perpendicular line passing the center of said ball with the respective grooves, thus the above-mentioned various disadvantages inherent in the prior art units can be obviated.

In the present linear motion rolling guide unit, as constructed as mentioned above, as the inclination angle of the side surface of the track rail member on which ball guide grooves are formed and thus the inclination angle of the opposing inner surface of the casing are made greater, the positions of the ball return passages can be located more inwardly toward the longitudinal axis of the casing, so that tool mounting holes can be located more inwardly theretoward, while the width of the unit as a whole can be minimized.

Moreover, in the direction changing passages of the casing is insured a smooth and less-resistant rolling of balls, yet realizing a highly accurate linear motion of the unit capable of withstanding any heavy load in the three dimentional directions under any vibration and impact.

BRIEF DESCRIPTION OF THE DRAWINGS

FIG. 2 is a transversally cross sectional view showing the present unit with its right-hand half being shown in section, FIG. 3 is an enlarged view of the load guide groove portion of FIG. 2, FIGS. 5 and 6 are transversely cross sectional views illustrating the constructions of prior art linear motion rolling guide units, respectively.

DESCRIPTION OF THE PREFERRED EMBODIMENTS

The present invention will be explained in details hereinbelow with reference to the attached drawings.

Figure 1:
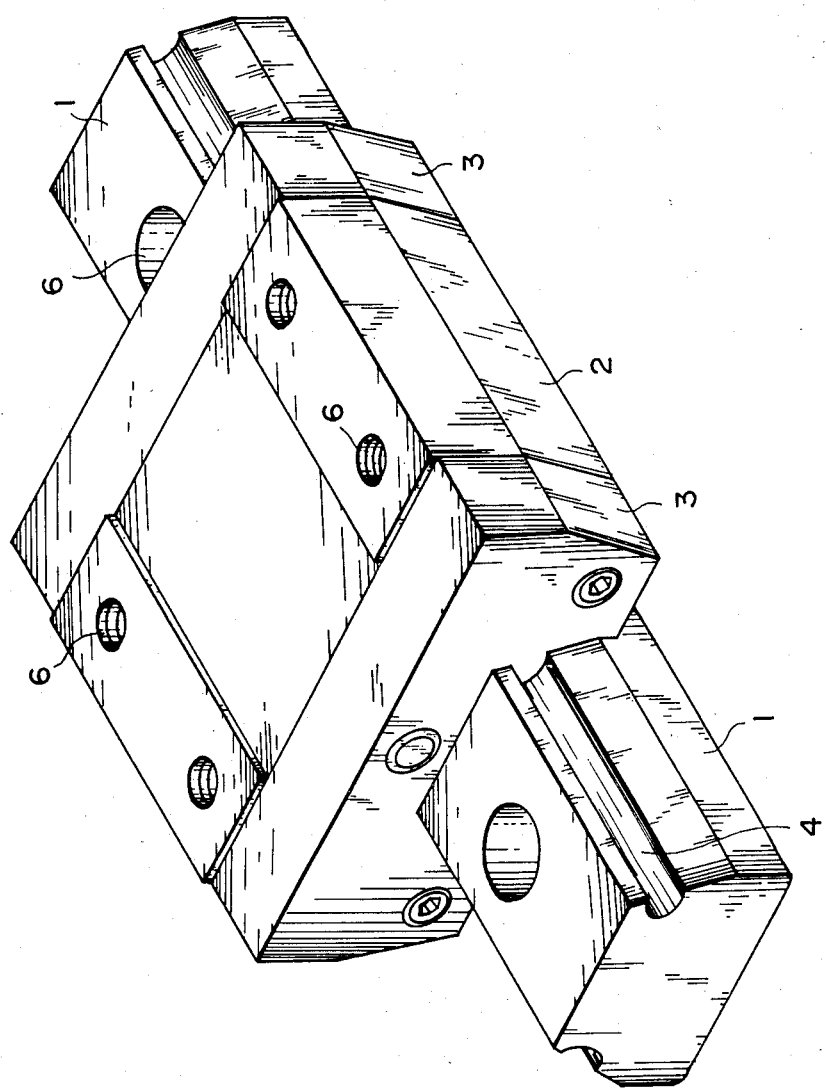
FIG. 1 is a perspective view showing the whole body of the first embodiment of the present compact size linear motion rolling guide unit.

Referring to FIG. 1 illustrating in a perspective view, one of the embodiments of the present linear motion rolling guide unit, track rail member 1 has a generally square cross section as a whole and in particular, a trapezoidal shape with a pair of inclined side surfaces each having rail side guide groove 4 extending in the longitudinal direction.

A slidable casing 2 has a cutout on its underside having a configuration comforming to that of the upper portion of said track rail member 1 so that the slidable casing 2 may straddle on the track rail member 1 with said cutout of the casing snugly receiving the upper portion of the track rail member 1.

On a pair of inclined side surfaces of said track rail member 1 are formed track rail side guide grooves 4 one on each surface, while on the inner surface of said cutout of the slidable casing 2 are formed a pair of casing side guide grooves 4 located at the positions opposite to said track rail side guide grooves, thus forming a pair of load bearing trackways for rolling balls between the track rail side guide grooves 4 and the casing side guide grooves 4'. When the slidable casing 2 is assembled with the track rail member 1 in a straddling relation, a plurality of balls 10 are intervened between the respective guide grooves 4 and 4' so as to allow a smooth relative and sliding movement between the track rail member 1 and the slidable casing 2 straddling thereon.

During the relative and sliding movement of balls, the balls located in the load bearing trackway advance toward the direction changing passage 5 provided in one of the side panels 3 as shown by dotted line in FIG. 2 and further to a ball return passage 7 longitudinally extending through the casing body and in parallel with said load bearing trackway, until they are again turned through another direction changing passage provided in the other opposite side panel to come back to the other end of the load bearing trackway from which they started rolling, thus the balls circulate along and through an endless circulation loop composed of the above-mentioned respective passage sections. As the balls smoothly move and circulate along and through said endless circulation loop, the casing can freely and smoothly move on the track rail 1.

Referring to FIG. 3 illustrating an enlarged view of the load trackway portion of the first embodiment of the present invention, a whole transversal cross section of which is illustrated in FIG. 2, the ball contacts with each of the track rail side guide groove 4 and casing side guide groove 4' at least at two points at the same time that are located at angles 30° and 90°, respectively, relative to either the horizontal or the vertical line passing through the center of the ball, so that this embodiment has been designed to provide marked rigidity against downwardly directed load applied thereto but such angular positions of the contact points between balls and guide groove surfaces may be optionally selected dependent on the purpose and conditions for which the relevant unit is used.

Namely, it should be noted that when each of the balls intervened between both the track rail side groove 4 and casing side guide groove 4' is brought into contact with both the guide grooves at least at the two points that are defined, referring to FIG. 3, by the intersecting points of a perpendicular line passing through the center of the ball with the respective surfaces of the opposing track rail side and casing side guide groove 4,4', the unit can exhibit the maximum resistance against any downwardly directed load applied thereto.

Furthermore, if the contact angles of the ball in the load bearing trackway with the trackway surface are set to 90° and 30°, respectively, relative to a horizontal line passing through the center of the ball, the load bearing ratio of the downwardly directed load with the upwardly directed load turns out to be 2:1 that forms the most preferable load balance conditions under which the present linear motion rolling guide unit is used for many purposes.

FIG. 4 shows transversal cross sections of the constructions of the first and second embodiments, respectively, of the present invention.

Figure 4A:
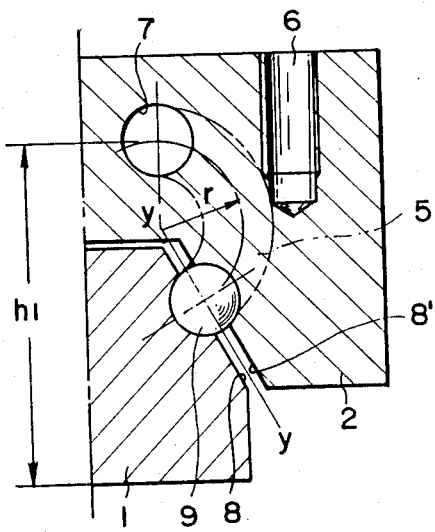
FIG. 4 is a schematic illustration of the right hand half in transversal section of the present linear motion rolling guide unit, wherein (a) is a first embodiment and (b) is a second embodiment.

In FIG. 4(a) illustrating the first embodiment, a direction changing passage 5 is so located as to depict, as seen in a cross section vertical to the axis extending in the direction of sliding movement of the casing 2, an arch with a radius r at the center point that falls on a straight line Y—Y passing the center of the ball 10 located in the load bearing trackway and extending in parallel to the inclined side surface 8 of the track rail 1, while the ball return passage 7 to be connected with one end of said direction changing passage 5 is formed in the casing with its center located at the level of the heighest height (h1) of the above-mentioned arc.

Since ball guide grooves are formed on the inclined side surfaces 8 and 8' of the track rail and casing, respectively, the position of the ball return passage 7 in the casing 2 may be shifted toward the longitudinal axis of the casing 2, therefore, tool mounting holes 6 to be provided in the casing may accordingly be located more inwardly thereto so that the cutting operation for engraving the guide grooves on the casing can be easily carried out.

According to the unique structure of the present guide unit wherein the ball return passages are formed on the highest possible level in the body of casing, when the load bearing trackway is formed between the inclined side surfaces of the track rail member and the casing as in the case of the first embodiment, the balls can move smoothly from the load bearing section to the non-loading bearing section of the endless ball circulation loop without encountering any sliding resistance.

Figure 4B:
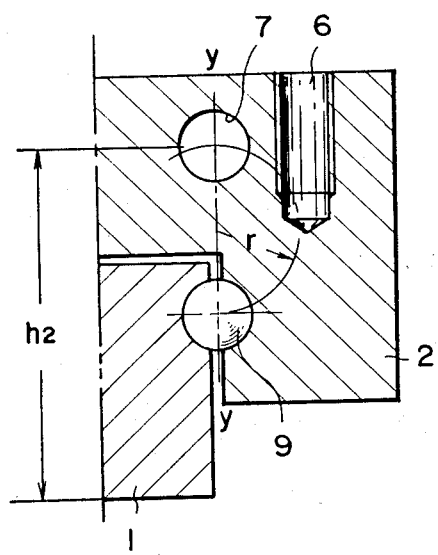

FIG. 4(b) shows a transversal cross section of the second embodiment of the present invention, wherein as ball guide groove has been formed on a vertical side surface of track rail member 1, the direction changing passage is so formed in the side panel as to depict an arc with a radius r at the center point falling on a vertical line passing through the center of the ball in the load bearing trackway, while a ball return passage is so formed in the body of the casing that the center of the ball return passage is located at the highest level (h2) of said arc.

In this embodiment, the ball return passage 7 is located substantially right over the ball 10 located in the load bearing trackway, so that even with the load bearing guide grooves being formed on the vertical side surfaces of the track rail member 1, the ball return passages can be formed in the body of casing at the positions as much inwardly as possible as seen in FIG. 4(b) from the perpendicular line passing the load bearing balls 10 located in the load bearing trackway, thus realizing a compact size of the whole unit assembly.

As having been stated above in details, the present invention is to provide a linear motion rolling guide unit, wherein the direction changing passage has the shortest possible length necessary for insuring a smooth travelling of balls therethrough, while at the same time reducing the number of balls in the non-load section of the endless ball circulation loop, yet minimizing the widthwise dimension of the whole unit.

While the above description provides a full and complete explanation of the preferred embodiments of the present invention, it should not be construed as limiting the scope of the present invention.

What is claimed is:

1. A compact size linear motion rolling guide unit comprising a track rail member having a generally square cross section, a slidable casing having an inverted U-shaped cross section and straddling said track rail member via a plurality of balls in freely movable relation therewith, side panels fixed onto the longitudinally opposing ends, respectively, of said slidable casing, said track rail member having, on the side surface, a pair of guide grooves for balls, each extending in parallel with the longitudinal axis of said track rail member, said slidable casing having, on the inner surface, a pair of guide grooves for balls in mating relation with a pair of said track rail side guide grooves so that one of the track rail side guide grooves and the mating casing side guide grooves form a load bearing passage for balls between the track rail member and the slidable casing, said slidable casing comprising a pair of ball return passages therewithin, each extending in parallel with said load bearing casing side guide grooves, each of said side panels comprising a pair of direction changing passages each adapted to connect one end of the casing side guide groove with the adjacent end of the ball return passage so that together with the direction changing passage of the opposite end side panel, an endless ball circulating path is formed, wherein in each of said side panels, each of said direction changing passage is so arranged, as seen on a cross section of the unit including a side panel and vertical to the travelling direction of the slidable casing, as to form an arcuate section of a circle having a center that is positioned, in the side panel, on a line passing through the center of a ball present in said load bearing passage and extending in parallel with the related inclined inner side surface of the slidable casing, while each of said ball return passages is formed, within the slidable casing, on the level corresponding to the uppermost part of said direction changing passage as seen in the same cross section mentioned above.

2. The linear motion rolling guide unit as claimed in the claim 1, wherein the guide groove-providing side surface of said track rail member as well as guide groove-providing inner side surface of said slidable casing is angularly formed.

3. The linear motion rolling unit as claimed in the claim 2, wherein each of the balls travelling through said load bearing passage is brought into contact with the track rail side groove and the casing side groove, respectively and simultaneously, at least at the opposing points that are defined by the intersecting points of a perpendicular line passing the center of said ball with the respective grooves.

* * * * *

UNITED STATES PATENT AND TRADEMARK OFFICE
CERTIFICATE OF CORRECTION

PATENT NO. : 4,797,012
DATED : 10 Jan 89
INVENTOR(S) : Kazuhiko Tanaka

It is certified that error appears in the above—identified patent and that said Letters Patent is hereby corrected as shown below:

<u>In The Drawings</u>

Figure 5:
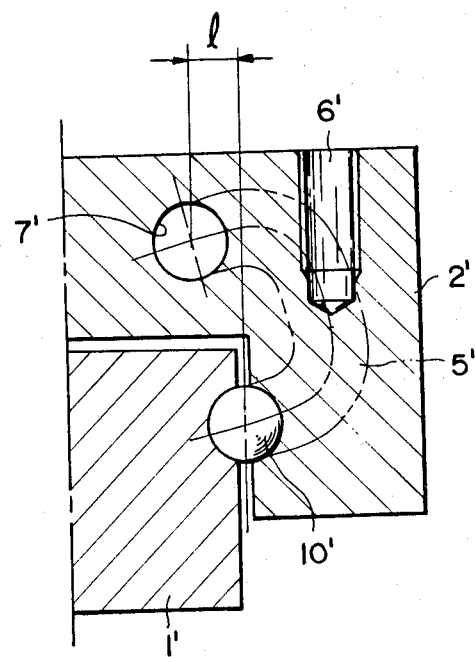

For Figs. 5 and 6, add the words, "Prior Art" after the headings.

For Fig. 6, add the words, "Fig. 6" before the sub-headings (the small letters in parentheses).

Signed and Sealed this

Eighth Day of May, 1990

*Attest:*

HARRY F. MANBECK, JR.

*Attesting Officer*  *Commissioner of Patents and Trademarks*